(12) United States Patent
Gray

(10) Patent No.: US 8,949,363 B2
(45) Date of Patent: Feb. 3, 2015

(54) DELAYED OR SUSPENDED ALERTS WITH MULTIPLE DEVICES IN PROXIMITY

(75) Inventor: Robert Cary Gray, Deerfield Beach, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 221 days.

(21) Appl. No.: 13/526,921

(22) Filed: Jun. 19, 2012

(65) Prior Publication Data

US 2013/0339436 A1 Dec. 19, 2013

(51) Int. Cl.
*G06F 15/16* (2006.01)
*H04L 12/58* (2006.01)
*H04L 12/18* (2006.01)
*H04L 12/24* (2006.01)

(52) U.S. Cl.
CPC .......... *H04L 12/587* (2013.01); *H04L 12/1895* (2013.01); *H04L 41/0604* (2013.01); *H04L 51/24* (2013.01); *H04L 12/1818* (2013.01)
USPC ............................. 709/207; 709/206; 709/224

(58) Field of Classification Search
CPC .............. H04L 12/587; H04L 12/1818; H04L 12/1895; H04L 51/24; H04L 41/0604
USPC .................. 709/206, 207, 224, 217; 340/506; 345/158; 725/36; 455/466, 413, 412.2, 455/418; 370/252
See application file for complete search history.

(56) References Cited

U.S. PATENT DOCUMENTS

| 6,237,027 | B1 | 5/2001 | Namekawa |
| 6,650,231 | B1 | 11/2003 | Byrne |
| 6,690,274 | B1 * | 2/2004 | Bristol ........................... 340/506 |
| 6,920,337 | B2 | 7/2005 | Pinsky et al. |
| 7,039,698 | B2 | 5/2006 | Slemmer et al. |
| 7,639,130 | B2 | 12/2009 | Orr |
| 7,849,181 | B2 | 12/2010 | Slemmer et al. |
| 2003/0023690 | A1 * | 1/2003 | Lohtia ........................... 709/206 |
| 2004/0254998 | A1 | 12/2004 | Horvitz |

(Continued)

FOREIGN PATENT DOCUMENTS

| EP | 1280314 | 1/2003 |
| WO | 01/69387 | 9/2001 |
| WO | 2004/049132 | 6/2004 |

OTHER PUBLICATIONS

Extended European Search Report dated Dec. 6, 2012 for European patent application No. 12172637.6.

*Primary Examiner* — Le H Luu
(74) *Attorney, Agent, or Firm* — Jose Gutman; Fleit Gibbons Gutman Bongini & Bianco P.L.

(57) ABSTRACT

A method and a plurality of communication devices configured to control notification of reception of a same message by at least one of the plurality of communication devices. The method includes determining that a plurality of communication devices are in proximity with each other, determining that a same message was received by the plurality of communication devices, and determining at least one communication device of the plurality of communication devices on which to inhibit producing a notification that indicates the message was received. The at least one communication device delays a pre-determined amount of time while monitoring for reception of a signal that indicates the message was read, and based on determination that the delay of the pre-determined amount of time has expired and that the communication device has failed to receive the signal, the communication device produces the notification.

23 Claims, 9 Drawing Sheets

(56) References Cited

U.S. PATENT DOCUMENTS

| | | |
|---|---|---|
| 2005/0053221 A1 | 3/2005 | Reding et al. |
| 2007/0298791 A1 | 12/2007 | Waung |
| 2008/0022302 A1* | 1/2008 | Tanaka et al. ............ 725/36 |
| 2008/0081674 A1 | 4/2008 | Orr |
| 2008/0109538 A1 | 5/2008 | Tosey |
| 2009/0143056 A1* | 6/2009 | Tang et al. ............. 455/418 |
| 2009/0203317 A1 | 8/2009 | Waung |
| 2010/0041333 A1 | 2/2010 | Ungari et al. |
| 2011/0029630 A1 | 2/2011 | Tosey |
| 2012/0295645 A1* | 11/2012 | Yariv et al. ............. 455/466 |
| 2013/0094371 A1* | 4/2013 | Vallath et al. ........... 370/252 |
| 2013/0100017 A1* | 4/2013 | Papakipos et al. ........ 345/158 |
| 2013/0166679 A1* | 6/2013 | Kuwahara ............... 709/217 |
| 2013/0210393 A1* | 8/2013 | Hillier ................... 455/413 |
| 2013/0325951 A1* | 12/2013 | Chakra et al. ........... 709/204 |
| 2013/0331067 A1* | 12/2013 | Coussemaeker et al. .. 455/412.2 |
| 2013/0332538 A1* | 12/2013 | Clark et al. ............. 709/206 |

* cited by examiner

MESSAGE ALERT PROFILE — 244

| PROF ID # 502 | DEVICE PRIORITY SCHEME 504 | CONDITION 506 | ACTION 508 | PARAMETER(S) 510 | OTHER PROFILE INFO 512 |
|---|---|---|---|---|---|
| 1 | DPS1 | C1 | A1 | P1 | |
| 2 | DPS2 | C2 | A2 | P2 | |
| 3 | DPS3 | C3 | A3 | P3 | |

530 → row 1, 540 → row 2, 550 → row 3

FIG. 5

| 2d DEVICE PROXIMITY STATUS | | |
|---|---|---|
| 2d DEV ID# *602* | PROXIMITY STATUS *604* | OTHER DEVICE INFO *606* |
| 1 | | |
| 2 | | |
| 3 | | |

DELAYED OR SUSPENDED ALERTS WITH MULTIPLE DEVICES IN PROXIMITY

FIELD OF THE DISCLOSURE

The present disclosure generally relates to personal electronic devices that provide alerts to users, and more particularly to synchronization of alerts provided by multiple personal electronic devices.

BACKGROUND

Many types of personal electronic devices (such as cellular phones, smartphones and some kinds of computers and portable computers, such as tablet computers or laptop personal computers, as well as some accessories such as some headsets) exchange data, such as audio data, voice data, image data, video data, text messages, and e-mails, and any combination thereof, with messaging servers over long range wireless data communication links in one or more wireless communication networks. Many such devices can communicate (e.g., with another device or base station) without a wired or cabled physical connection, and may be called wireless communication devices. One example of such wireless data communication links includes cellular-like data networks. Wireless communication devices can receive messages from remote servers over a wireless data communication link in a one-way or a two-way wireless communication protocol. Some of these personal electronic devices may be portable, and some may further be handheld, that is, sized and shaped to be held or carried in a human hand.

Communication devices are becoming so ubiquitous in society that users often own, or have authorized use of, two or more such communication devices. Users with two or more communication devices often receive and send data on all of their communication devices, possibly different devices using different communication links. For example, a user can receive emails on their laptop personal computer, optionally using a wireless modem, and contemporaneously will also receive the same emails on their wireless cellular phone devices. Moreover, the same emails may also be received via the user's desktop personal computer. All three devices, i.e., the laptop personal computer, the desktop personal computer, and the wireless cellular phone, may often be located in proximity with each other. In such a case, the user will typically be bombarded at the same time with multiple alerts indicating that the same message was received by each and every one of the plurality of user devices in proximity with each other. This repeated alerting by multiple user devices for every message received can be very disruptive to the user.

Additionally, mobile wireless communication devices typically use rechargeable power supplies, such as batteries or other electrical charge storage devices, to permit device operation while roaming and without being tethered to a particular stationary power source. As the rechargeable power source, e.g., the battery, in a wireless communication device becomes depleted, it can be recharged by connecting the device to a stationary power source, such as using a charger that is connected to an AC outlet. It may pose an inconvenience to a user or even worse a loss of function of the device if the battery depletes too far and no power supply is available to recharge. Repeated alerting by multiple user devices for every message received wastes battery power and thereby shortens battery life for battery operated user devices that are all alerting redundant and unnecessary alerts for the same message received at the same time.

BRIEF DESCRIPTION OF THE DRAWINGS

The accompanying figures in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 5 is a more detailed view of a message alert profile suitable for use in the communication device of FIG. 2, according to one example;

FIG. 6 is a more detailed view of a set of device proximity status flags suitable for use in the communication device of FIG. 2, according to one example;

DETAILED DESCRIPTION

Figure 1:
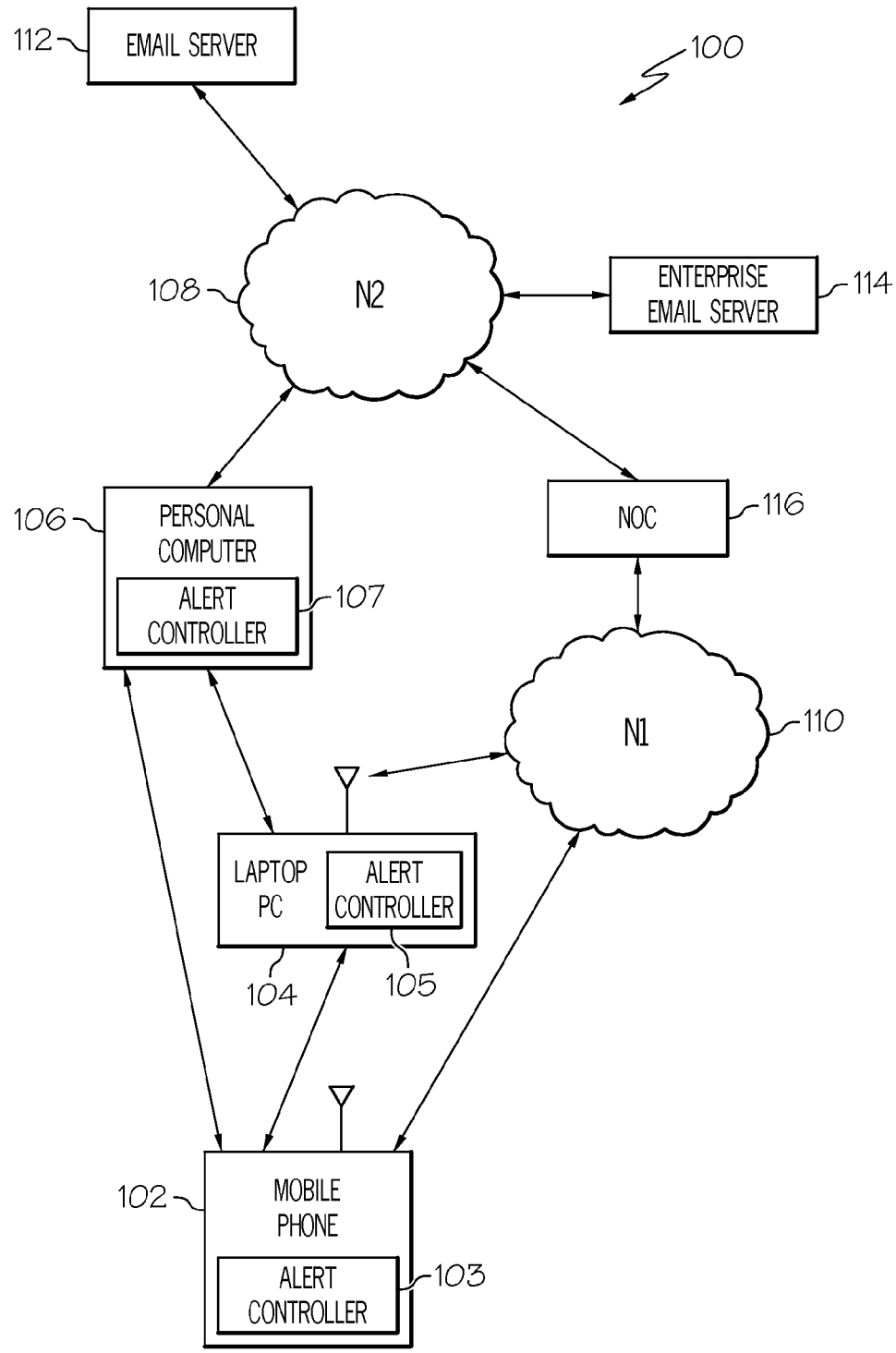
FIG. 1 is a block diagram illustrating one or more personal electronic devices comprising communication devices in a communication system, in accordance with one example.

In general, this disclosure is directed to a mechanism for providing a user of more than one personal electronic device, such as a smartphone, a personal computer, and a laptop personal computer, with the ability to intelligently manage alerts, such as inbound messaging asynchronous alerts for alerting a calendar event, or an asynchronous alert relating to the delivery of content to the several personal electronic devices. The individual personal electronic devices have the ability to establish that they are in close proximity with each other and therefore only one of the devices, such as a primary device, may provide an alert to the user that the user can then access one or more of the devices to determine the calendar event or to retrieve the particular content received. Further, according to one example, if two or more of the devices are in proximity, a time delay for alerting may occur for one or more of the devices that are not the primary device. In this arrangement, an alert to the user by the primary device is followed by an alert to the user from at least one of the secondary devices serving to remind the user, for example, that a particular calendar event has occurred or a content was received by one or more of the devices.

As required, detailed embodiments are disclosed herein; however, it is to be understood that the disclosed embodiments are merely examples and that the devices, systems and methods described below can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any appropriately detailed structure and function. Further, the terms and phrases used herein are not intended to be limiting, but rather, to provide an understandable description. Additionally, unless otherwise specifically expressed or clearly understood from the context of use, a term as used herein describes the singular or the plural of that term.

The terms "a" or "an", as used herein, are defined as one or more than one. The term "plurality", as used herein, is defined as two or more than two. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, commanded, altered, modified, built, composed, constructed, designed, or that has any combination of these characteristics to carry out a given function. The term "adapted to" describes hardware, software or a combination of hardware and software that is capable of, able to accommodate, to make, or that is suitable to carry out a given function. The terms "controller", "computer", "server", "client", "computer system", "computing system", "personal computing system", or "processing system" describe examples of a suitably configured processing system adapted to implement one or more embodiments of the present disclosure. Any suitably configured processing system is similarly able to be used by embodiments of the present disclosure, for example and not for limitation, a personal computer, a laptop computer, a tablet computer, a personal digital assistant, a workstation, or the like. A processing system may include one or more processing systems or processors. A processing system can be realized in a centralized fashion in one processing system or in a distributed fashion where different elements are spread across several interconnected processing systems. The term "personal computing system" describes a processing system that includes a user interface and which is suitably configured and adapted to implement one or more embodiments of the present disclosure. The terms "network", "computer network", "computing network", and "communication network", describe examples of a collection of computers and devices interconnected by communications channels that facilitate communications among users and allows users to share resources. The terms "wireless network", "wireless communication network", and "wireless communication system", similarly describe a network and system that communicatively couples computers and devices primarily or entirely by wireless communication media. The terms "wired network" and "wired communication network" similarly describe a network that communicatively couples computers and devices primarily or entirely by wired communication media.

The term "personal electronic device" is intended to broadly cover many different types of electronic devices used by persons, and that can receive signals transmitted from other devices, and optionally can transmit signals to other devices for reception by the other devices. The term "communication device" is intended to broadly cover many different types of personal electronic devices that can receive signals, and in most cases can transmit signals, to communicate with other devices, and may also operate in a communication system. The term "wireless communication device" is intended to broadly cover many different types of communication devices that can wirelessly receive signals, and in most cases can wirelessly transmit signals, and may also operate in a wireless communication system. For example, and not for any limitation, a wireless communication device can include any one or a combination of the following: a two-way radio, a cellular telephone, a mobile phone, a smartphone, a two-way pager, a wireless messaging device, a personal computer, a laptop personal computer, a tablet computer, a personal digital assistant, and other similar devices.

The term "portable electronic device" is intended to broadly cover many different types of personal electronic devices that are portable or that can be transported between locations by a user. For example, and not for any limitation, a portable electronic device can include any one or a combination of the following: a wireless communication device, a laptop personal computer, a notebook computer, a desktop computer, a personal computer, a Personal Digital Assistant, a tablet computer, gaming units, and other handheld electronic devices that can be carried on one's person.

The terms "proximate" or "in proximity" are intended to broadly cover many different types of physical arrangements between two or more devices, where alerts emitted from a first device at a first location (or any human-detectable signal produced by the first device) can contemporaneously be perceived by a person at a second location of a second device. For example, and not for limitation, two devices can be in proximity with each other if both devices are physically located in or about the same room in a building.

Various embodiments solve problems discussed above by providing alert synchronization between a plurality of personal electronic devices which in the present example may also be referred to as portable electronic devices, such as between both a mobile phone and a personal computer. A novel method can improve battery life of one or more of a plurality of personal electronic devices by managing which of a plurality of personal electronic devices, in proximity with each other, provides an alert associated with an event for a user of the plurality of personal electronic devices. The other devices, which do not alert the event, avoid wasting battery power on redundant and annoying alerts. Proximity, according to certain embodiments, can be determined by wireless means—for example, using short range communications based on any short range wireless technology such as, but not limited to, BLUETOOTH®, ZIGBEE®, and Near Field Communication (NFC) technologies, or using WIFI, or by other means—for example if a smartphone detects that it is connected via universal serial bus (USB) to a desktop computer, the smartphone therefore determines it is in close proximity with the desktop computer. One of the devices could be configured as the primary alerting device when more than one device is in proximity with each other. The non-primary (i.e., secondary alerting) device(s) would either not play the alert to the user, or delay playing the alert by a period of time long enough that the user could respond on any of the devices, thus dismissing the pending alert(s) on the other non-primary device(s).

According to one example, once a mobile phone and a personal computer commonly in use by one user, are in proximity to each other, a synergistic communication protocol is established between the two portable electronic devices (i.e., the mobile phone and the personal computer). Alerts from each of the two portable electronic devices are synchronized between the two devices, thereby providing flexibility in what user interface of at least one of the devices provides the alerts to the user. When messages (e.g., emails, text messages, instant messages, and the like) are received by at least one of the portable electronic devices, for example, message received alerts are provided to the user by one or both devices. In various embodiments, for example, messages (e.g., emails, text messages, instant messages, and the like) received by the mobile phone can be transferred to the personal computer via short range wireless communication, allowing a user interface in the personal computer to present alerts and messaging information to the user. Alternatively, messages received by the personal computer can be transferred to the mobile phone via short range wireless communication, allowing a user interface in the mobile phone to present alerts and messaging information to the user.

Additionally, in some embodiments, a first communication system includes message communication with the personal computer and a second communication system includes message communication with the mobile phone. Transmission of duplicate messages, such as email messages, to the two devices can be avoided when both devices are in proximity with each other. Messages received by one of the devices can be transferred to the other device via short range wireless communication. Then, either device can provide alerts to the user, according to an alert synchronization arrangement configured between the two devices. This arrangement helps improve data throughput in the first and second communication systems, which in some cases could be the same communication system, and thereby improves utilization of resources in the two devices. These and more aspects of the disclosure will be discussed in more detail below.

It is common for users of email, instant messaging, calendar management tools, and similar services to access these services from multiple portable electronic devices. For example, a user may access a personal computer, a table computer, a laptop personal computer, and a smartphone. When a message, a meeting notice, or other alert signal is received by two or more of the portable electronic devices that are in proximity with each other, each of the devices plays an alert. This can be annoying and disruptive to a user, as well as to others in the environment if several of the devices are in proximity and all alert at approximately the same time. For example, both a personal computer, and a smartphone may alert at the same time with respect to the same message received by both devices.

This problem can be solved, according to one example, by changing the notification of alert's behavior of the several portable electronic devices that are known to be in proximity with each other. Proximity, in one example, could be determined by wireless means, for example, using BLUETOOTH®, ZIGBEE®, or Near Field Communication (NFC) technologies, or using WIFI, or, according to another example, by other means such as a wired cabling interface. For example, if a smartphone is connected via USB cable to the desktop personal computer, then the smartphone is determined to be in close proximity to the personal computer.

One of the personal electronic devices may be configured as a primary device for alerting to a user when more than one device is in proximity with each other, and the other devices would either not play the alert, or would delay playing the alert by a period of time long enough that the user could respond on any of the devices, thus dismissing the pending alerts on the other devices. The notification behavior of the several devices can be configured by the user in some of the embodiments of the present disclosure.

Referring to FIG. 1, an example of a communication system for implementing one example of the present disclosure is shown. The communication system 100 illustrates, in this example, a user having three computing devices that can be used by the user while the devices are in proximity with each other. As shown in FIG. 1, a mobile phone 102 (such as a smartphone), a laptop personal computer 104, and a desktop personal computer 106 are used by the same user. These three personal electronic devices, 102, 104, 106, at times may be located in proximity with each other. For example, while working at an office, the user may have the desktop personal computer 106 on her desk, the laptop personal computer (PC) 104 located on a table near the desk in the office, and a mobile phone 102 located also on the desk. Each of the three personal electronic devices 102, 104, 106, according to the present example, includes a respective alert controller 103, 105, and 107. Various operations and configurations for the alert controller 103, 105, and 107, will be discussed below.

The desktop personal computer 106 is communicatively coupled to a wide area network N2 108, such as the internet and the world wide web. The laptop PC 104 and the mobile phone 102, in this example, are wirelessly communicatively coupled with one or more wireless communication networks N1 110. In this example, the laptop PC 104 includes a wireless communication interface that communicatively couples the laptop PC 104 with the wireless communication network N1 110. In certain examples, while not shown in FIG. 1, the desktop personal computer 106 could similarly include a wireless communication interface that communicatively couples the desktop personal computer 106 with the wireless communication network N1 110.

An email server 112 is communicatively coupled with the wide area network N2 108. The email server 112, according to one example, comprises one or more general purpose email server systems, such as provided by commercial email systems such as GMAIL™, HOTMAIL®, or any similar type of commercial email server system available to users via Internet communication. This email server 112, according to various examples, may optionally comprise a private email server system such as provided inside a private company email server system, a private government email server system, a private user email server system, and the like. Additionally, a server such as an enterprise email server 114, in the current example, is also communicatively coupled with the wide area network N2 108.

Additionally, a network operation center (NOC) 116 (also referred to as a server system 116 or a server 116), according to the present example, is communicatively coupled with the wide area network N2 108. The NOC 116 includes one or more information processing systems, memory storage systems, communication interfaces, and administrative and technical personnel user interfaces. The NOC 116 provides control for the one or more wireless communication networks N1 110, and also is a gateway for messaging between the wide area network N2 108 and the wireless communication network N1 110.

The desktop personal computer 106 can receive messages and send messages via the network N2 108. The mobile phone device 102, according to the present example, can wirelessly receive messages and wirelessly send messages via the wireless network N2 110, in communication with the NOC 116. The email server 112 and the enterprise email server 114 can receive email messages and send email messages via the network N2 108. The email server 112 and the enterprise email server 114 can also efficiently transmit email messages (and receive email messages), via the NOC 116 and the wireless network N1 110, to/from wireless communication devices, such as the mobile phone device 102, operating in the wireless network N1 110.

In this example, a wireless communication device comprises a wireless two-way communication device with data communication capabilities and optionally with voice communication capabilities. Such wireless communication devices communicate with a wireless voice or data network using a suitable wireless communication protocol. Wireless voice communications are performed using either an analog or digital wireless communication channel. Data communications allow the wireless communication device to communicate with other computer systems such as via the Internet N2 108. Examples of wireless communication devices that are able to incorporate the above described systems and methods include, without limitation, a data messaging device, a two-way pager, a cellular telephone with data messaging capabilities, a wireless Internet appliance, or a data communication device that may or may not include telephony capabilities.

As shown in the present example, the desktop personal computer 106 is in a communication arrangement with the laptop PC 104 and also in a separate communication arrangement with the mobile phone 102. The laptop PC 104 is also in a communication arrangement with the mobile phone 102. These communication arrangements can be wired or wireless communication that allow the devices 102, 104, 106 to communication with one another when located in proximity to each other. Once the devices 102, 104, 106, are in proximity with each other, the alert controller 107 of the desktop personal computer 106 manages an alerting function for the desktop personal computer 106, a separate alert controller 105 manages an alerting function for the laptop PC 104 and a third alert controller 103 manages an alerting function for the mobile phone 102. The three alert controllers 103, 105, 107, additionally can interoperate when the three devices 102, 104, 106, are in proximity with each other. By interoperating with each other, the alert controllers 103, 105, 107, can coordinate alerts to the user of the three devices 102, 104, 106, from any one or more of the three devices 102, 104, 106. Coordination of alerts provided to a user from one or more of the devices 102, 104, 106, as well as coordination of messaging, will be discussed in more detail below according to various embodiments of the present disclosure.

Figure 2:
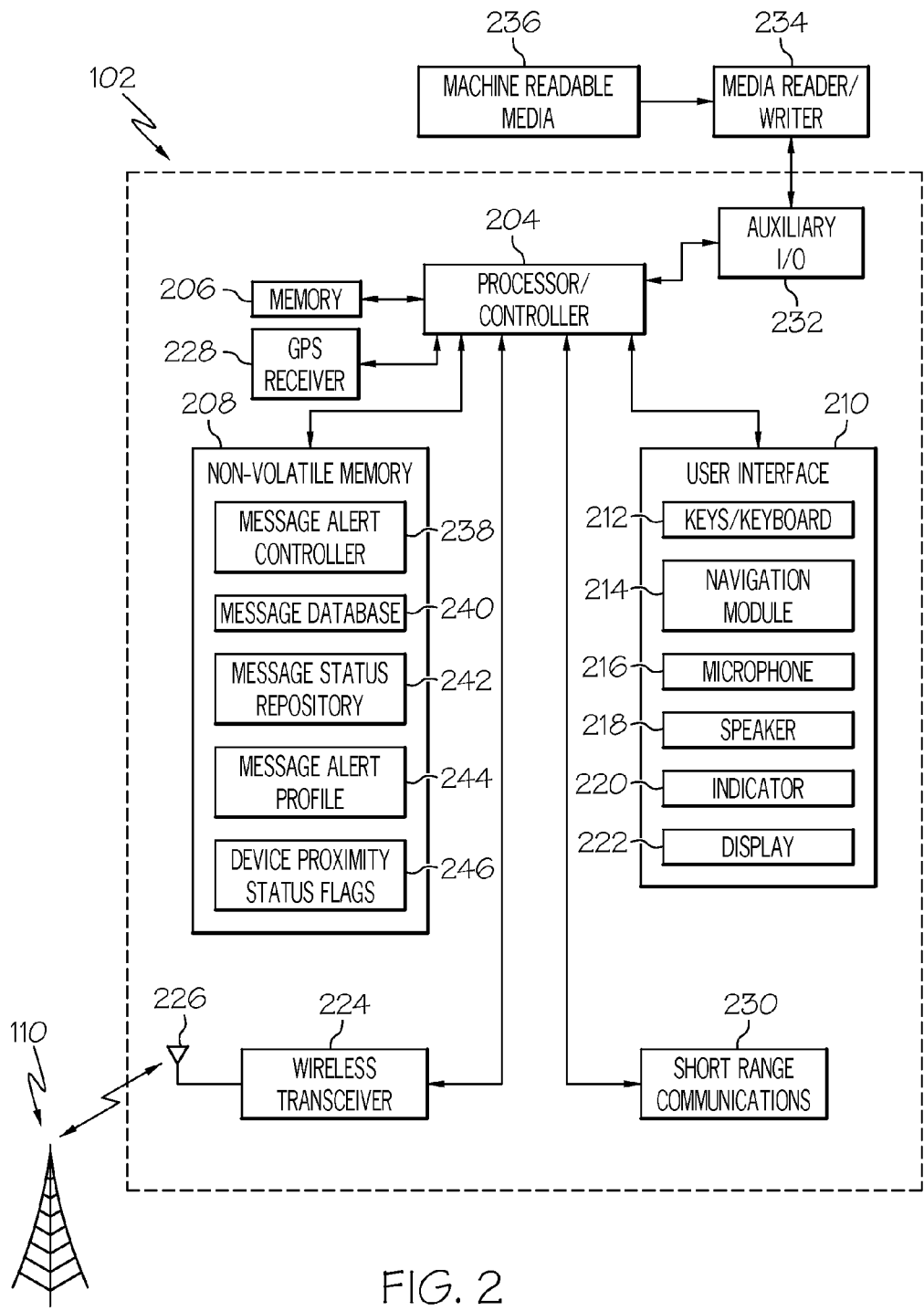
FIG. 2 is a block diagram illustrating a more detailed view of an example personal electronic device comprising a communication device in the communication system of FIG. 1.

Referring to FIG. 2, an example of a more detailed functional block diagram of the mobile phone 102 is shown, according to one example of the present disclosure. While the present discussion is generally directed at a detailed block diagram of the mobile phone 102, many of the components illustrated in FIG. 2 may be similarly found in other types of electronic devices, such as the desktop personal computer 106 and the laptop PC 104 shown in FIG. 1.

The mobile phone 102 is shown wirelessly communicatively coupled with the one or more wireless communication networks 110. The mobile phone 102 includes at least one processor/controller 204. The processor/controller 204 is communicatively coupled with a memory 206, such as random access memory (RAM). The processor/controller 204 is also coupled with non-volatile memory 208, such as flash memory, which can, for example, store program and data for the operation of the processor/controller 204.

The processor/controller 204 is communicatively coupled with a user interface 210. The user interface 210 facilitates a user of the device 102 to interact with the device 102. The user interface 210, according to the present example, includes keys, buttons, slide switches, and a keyboard 212. The user interface 210 includes a navigation module 214, such as including a trackball, a touchpad, or a navigational pad, which can track finger movement on top of the navigation module 214 to move a pointer or cursor on a display screen. In one example, a keypad may be deployed in combination with a display as a touch screen keypad on the display screen.

A microphone 216 can receive audio from the user of the mobile phone 102. A microphone 216 receives audio from the ambient environment around the microphone 216. The microphone 216 can also accept voice audio from a user of the device 102. In the case when the device 102 comprises a mobile phone (or a smartphone), the microphone 216 can be used as part of a mouth piece of a phone for a user to speak into. The keys/keyboard 212, the navigation module 214, and the microphone 216, are examples of user input devices for receiving input from a user.

The user interface 210 includes a speaker 218 that can output audio signals to a user of the mobile phone 102.

The user interface 210 includes at least one indicator. Examples of an indicator include a visual indicator, an audible indicator, and a haptic indicator. A visual indicator may include a lamp, an LED, or an element visible on a display. An audible indicator may include a signal output from a speaker, a buzzer, or other sound emitting device. An example of a haptic indicator includes a vibrating element that provides tactile feedback from the mobile phone 102 to a user.

The user interface 210 includes a display 222 that can display information to the user of the mobile phone 102. There are many types of display technologies that could be implemented as a display 222. For example, the display 222 could be implemented incorporating display technology such as liquid crystal display (LCD) technology, organic light emitting diode (OLED) display technology, and the like.

The mobile phone 102 includes a wireless transceiver 224 (i.e., a long range wireless communication transceiver) that is coupled to the processor/controller 204. The wireless transceiver 224 is coupled to an antenna structure 226 to facilitate wireless communication between the mobile phone 102 and the one or more wireless communication networks 110. The processor/controller 204, in this example, includes at least one digital signal processor (DSP) that performs processing to extract data from received wireless signals and to generate signals to be transmitted. A global positioning system (GPS) receiver 228 is coupled to the processor/controller 204 and wirelessly receives GPS signals and thereby provides location information for the mobile phone 102 to the processor/controller 204.

The mobile phone 102 includes at least one short range communications device 230 that is communicatively coupled with the processor/controller 204. The short range communications device 230 allows short range wireless communication between the mobile phone 102 and other devices similarly configured with other short range communications devices that are typically (but not necessarily) in proximity to the mobile phone 102. It should be noted that according to various embodiments certain alternatives to the short range communications device 230 may include a short range wireless communication transmitter, a short range wireless communication receiver, or both. According to one example, the short range communications device 230 includes a coil as part of a short range wireless communication interface that facilitates coupling short range wireless communication signals between the mobile phone 102 and another device in proximity. The mobile phone 102 may also comprises a short range communications device 230 that allows communication with other devices via a short range wireless network (not shown) or directly using short range peer-to-peer protocols without the use of a short range wireless network. The short range communications can be based on any short range wireless technology such as, but not limited to, BLUETOOTH®, ZIGBEE®, and Near Field Communication (NFC) technologies.

An auxiliary I/O interface 232 is communicatively coupled with the processor/controller 204 in the mobile phone 102. Through the auxiliary I/O interface 232 the processor/controller 204 is able to communicate information with external devices that are typically tethered with the mobile phone 102. The tethered connection between the mobile phone 102 and an external device can include one or more of the following technologies: wired link, optical data link, power line communication, USB interface communication, and the like. According to one example, input-output data ports in the auxiliary I/O interface 232 are communicatively coupled with the controller 204 and provide interface options between the device 102 and other devices such as via a USB interface that allows communication of information between the device 102 and, for example, a personal computer (such as the desktop personal computer 106 or the laptop PC 104 shown in FIG. 1).

According to the present example, a media reader/writer device 234 is communicatively coupled with the mobile phone 102 via the auxiliary I/O interface 232. The media reader/writer device 232 can include one or more of the following technologies: CD, DVD, floppy drive, optical drive, removable media drive, and the like. Machine readable media 236 can be coupled with the media reader/writer 234 such that the media reader/writer 234 can read information from (and optionally write information to) the machine readable media 236.

Stored in the non-volatile memory 208 are several programs and data that interoperate with the processor/controller 204 to provide features and functions of the mobile phone 102 according to various embodiments of the present disclosure.

According to the present example, an alert manager/controller 238 (also referred to in this example as a message alert controller 238) is stored in the non-volatile memory 208 and interoperates with the processor/controller 204 to provide alert manager/controller features and functions of the mobile phone 102. The alert manager/controller 238 manages certain alerting features and functions of the mobile phone 102, as will be discussed in more detail below. It should be noted that while the present example discusses alerts being played by one or more devices in relation to a message received event, the playing of alerts by one or more devices should be understood broadly covers many different types of events and conditions where alerts may be played by one or more devices. For example, devices could play alerts in relation to calendar events, or in relation to task reminder events, or in relation to any other types of events that would notify a user of the device that user-interaction with the device is requested by the device.

According to the present example, a message database 240 is stored in the non-volatile memory 208, and maintains information related to messages that are received by the mobile phone 102. A message status repository 242 maintains message status and related information associated with messages stored in the message database 240. A message alert profile 244 includes profile information for one or more alerts of the mobile phone 102, as will be discussed in more detail below. Device proximity status flags 246 maintain proximity information and related information for one or more devices that might be in proximity to the mobile phone 102. The general structure and function of these various modules stored in the non-volatile memory 208 will be discussed in more detail below in accordance with various embodiments of the present disclosure.

Figure 3:
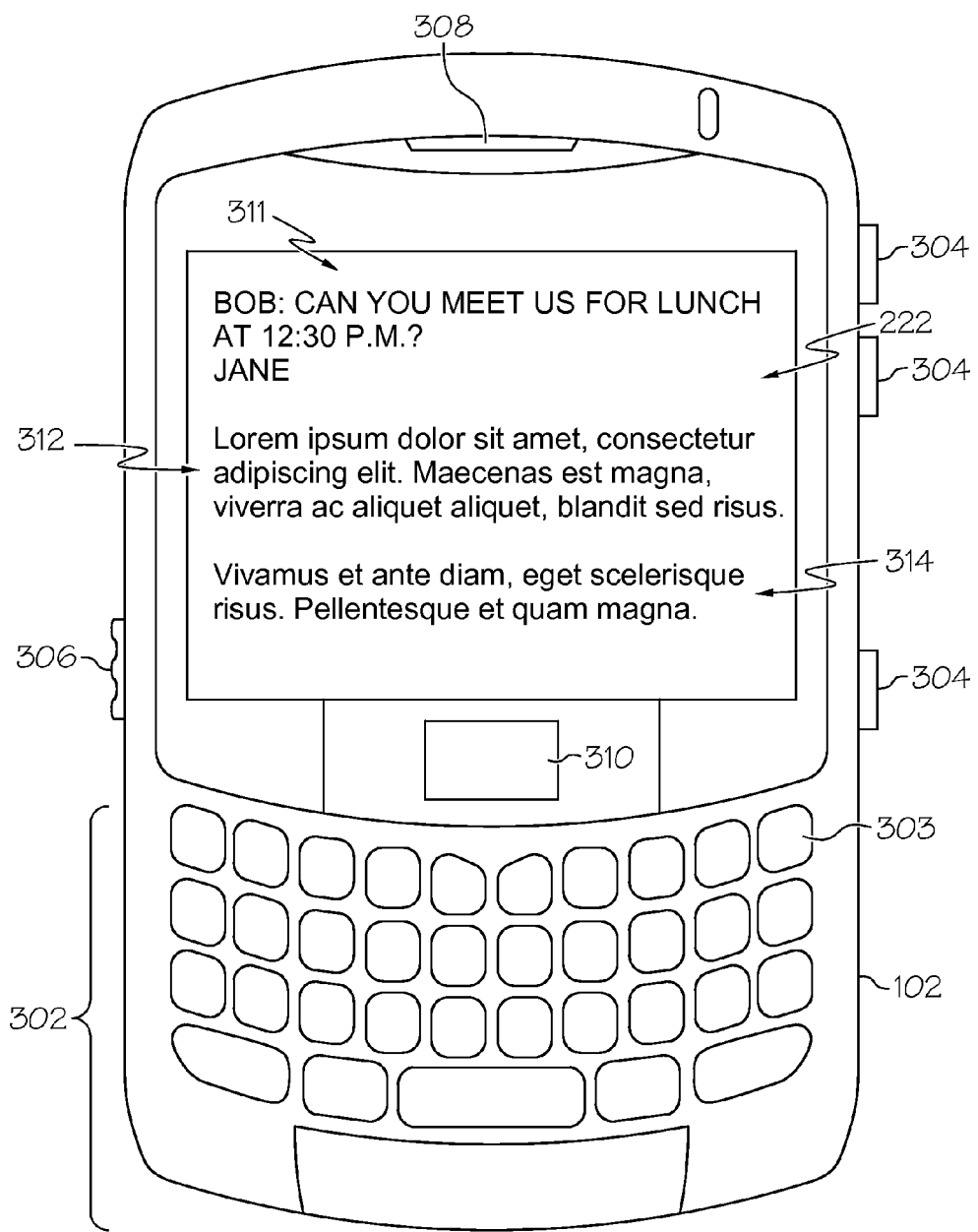
FIG. 3 is an outer view of the communication device of FIG. 2, illustrating a user interface that is accessible by a user.

Referring to FIG. 3, an example of the mobile phone 102 is illustrated showing various components of the user interface 210 shown in FIG. 2. A keyboard 302 includes several keys 303 for receiving user input from a user of the mobile phone 102. Several buttons 304 and a slide switch 306 provide additional ways that a user may enter input to the mobile phone 102. A navigation module 310, such as a track pad, can be used by a user moving a finger or other stylus over the track pad to enter input into the mobile phone 102. Several messages 311, 312, 314, are shown displayed in the display 222. For example, a first message 311 asks Bob whether he can meet us for lunch at 12:30 pm, signed Jane. These messages 311, 312, 314, may be received by the mobile phone 102 in different ways. However, contemporaneous with a message being received by the mobile phone 102, an alert is generated by the mobile phone 102 to notify the user that the message has been received. The user then has the option, according to certain examples, to read a message, e.g., the received message, on the display 222.

For example, the user may press a button 304 that causes a message 311 to be displayed on the display 222. In this way the user can read the message 311 when the user is ready. At other times, the message remains stored in the message database 240 waiting to be read. Optionally, the user can delete a message without reading it. According to certain examples of the present disclosure a message 311 can be automatically displayed on the display screen 222. In this case, the message 311 is assumed to have been read by the user of the mobile phone 102.

A speaker 308 on the mobile phone 102 provides audible signals to a user. The speaker 308, for example, can provide audible indication signals to alert the user that a message 311 has been received and is waiting to be read. One or more indicators 220, as has been discussed above, may be used individually or in combination to provide one or more alerts to a user of the mobile phone 102.

Figure 4:
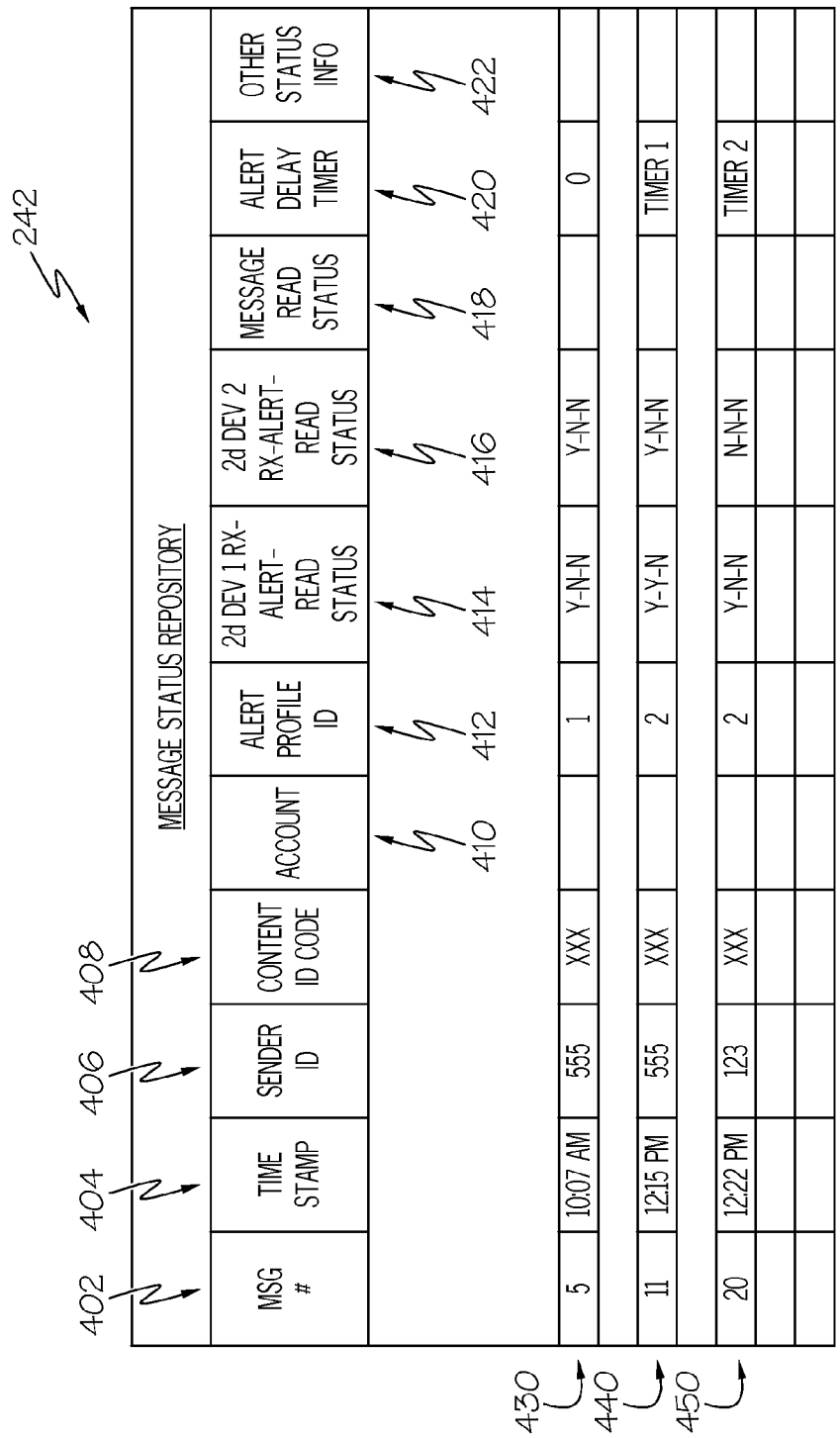
FIG. 4 is a more detailed view of a message status repository suitable for use in the communication device of FIG. 2, according to one example.

Referring to FIG. 4, a more detailed view of the message status repository 242 (also see FIG. 2) is illustrated. The message status repository 242 is configured to contain one or more entries of message status information corresponding to messages stored in the message database 240. Each entry in the message status repository 242 includes several pieces of information as indicated at the top row of the message status repository 242.

A message number 402 indicates a particular message that is stored in the message database 240 which corresponds to the particular entry in the message status repository 242. For example, three entries 430, 440, 450, are shown. The first entry 430 indicates that it is associated with message number five. The second entry 440 indicates that it is associated with message number eleven. The third entry 450 indicates that it is associated with message number 20.

Time stamp information 404 is included with each entry to indicate at least one of: 1) a time when the message was sent by the message originator, 2) a time when the message was received by the message recipient, in this case the mobile phone 102, or to indicate both pieces of information. In the present example, the time stamp information 404 indicates the time that a particular message was sent by a message originator. That is, for example, a user on or about 10:07 a.m. requested the email server 112 (see also FIG. 1) to send an email message to the mobile phone 102. Accordingly, the first entry 430 in the message status repository 242 shows a time stamp of 10:07 a.m., which corresponds to the time that the originator originated the message and the email server 112 sent the email message into the network 108 destined for reception by the recipient mobile phone 102. Other messages also were sent to the mobile phone 102 with corresponding time stamps as follows: the second entry 440 shows a time stamp of 12:15 p.m., and the third entry 450 shows a time stamp of 12:22 p.m.

Sender ID information 406 is included in each entry 430, 440, 450, according to the present example. This sender ID information 406 indicates the originator of the message that was sent and received by the recipient, in this case the mobile phone 102. For example, sender 555 sent the first message corresponding to the first entry 430 and the second message corresponding to the second entry 440. However, a different sender 123 sent the third message corresponding to the third entry 450.

According to the present example, Content ID code information 408 is included with each entry 430, 440, 450, in the message status repository 242 to help quickly identify the content of a message received and stored in the message database corresponding to a particular entry in the message status repository 242. For example, a hash code could be used according to a pre-arranged hash function to enable a relatively quick comparison of hash codes to compare the message content of one message to the message content of another message. Optionally, as another example, a Cyclic Redundancy Check (CRC) code could be used in association with the content of each message thereby enabling a fast comparison of CRC codes to compare message content between messages. Other similar types of content ID codes could be used as alternatives to the hash codes and the CRC codes to help identify the content of a message received and stored in the message database.

In the present example, account information 410 is also included in each entry in the message status repository 242. The recipient of messages may be associated with one or more accounts that each receives messages that are stored in the message database 240. For example, a user of the mobile phone 102 may subscribe to two different accounts for receiving email messages. Messages received by each of these accounts would be segregated by the account information 410 in each entry in the message status repository 242. In certain situations, one or more of the accounts may have elevated priority that is higher than the other accounts for the user. The alerting of received messages for the higher priority accounts would be first over the alerting of received messages for the lower priority accounts.

According to the present example, alert profile ID information 412 is included in each entry 430, 440, 450, in the message status repository 242. The alert profile ID information 412 associates messages stored in the message database 242 that have entries in the message status repository 242 with particular alert profile information (e.g., as shown in FIG. 5), as will be discussed in more detail below. As shown in the present example on FIG. 4, the first message corresponding to the first entry 430 is associated with alert profile ID number one, the second message corresponding to the second entry 440 is associated with alert profile ID number two, and the third message corresponding to the third entry 450 is associated with alert profile ID number two.

Each entry in the message status repository 242 can include one or more flags to indicate whether the same message was received and possibly read by another device (e.g., in this example also referred to as a secondary device) in proximity to the present device, in this case the mobile phone 102 (e.g., in this example also referred to as the primary device). According to the present example, a set of flags 414 in each entry 430, 440, 450, in the message status repository 242 indicates whether a first secondary device has received, alerted, and the user has read, the same message as corresponding to the particular entry 430, 440, 450, in the message status repository 242. That is, for example, in the case where the first secondary device is the personal computer 106 (see FIG. 1), a set of flags 414 are used to indicate whether the same message as stored in the message database 240 in the mobile phone device 102 was received by, alerted by, and read by the user of, the desktop personal computer 106. This type of status information is maintained in the message status repository 242 with respect to a first secondary device, such as the desktop personal computer 106 in the present example. This type of information is also maintained for other secondary devices such as the laptop PC 104 (see FIG. 1). For example, the first entry 430 in the message status repository 242 includes status information 414 (i.e., Y-N-N) corresponding to the desktop personal computer 106 indicating that the same message was received by the desktop personal computer 106, and was not alerted and not read by the user. Further, a second piece of information 416 (i.e., Y-N-N) in the first entry 430 indicates that the laptop PC 104 received the same message and did not alert and the message was not read by the user.

As shown in FIG. 4, the second entry 440 and the third entry 450 illustrate other examples of status information 414 for the first secondary device (e.g., the desktop personal computer 106), and status information 416 for the second secondary device (e.g., the laptop PC 104). Various examples of how this status information 414, 416 maintained in the message status repository 242 is used according to various examples of the present disclosure will be discussed in more detail below.

Message read status information 418 is included in each entry in the message status repository 242. The message read status information indicates whether the message stored in the message database 240 that corresponds to the particular entry 430, 440, 450, in the message status repository 242 was read by a user of the device, in this case the mobile phone 102.

In certain examples of the present disclosure, alert delay timer information 420 is maintained for each message stored in the message database 240. Since each entry 430, 440, 450, corresponds to a respective message stored in the message database 240, for each entry 430, 440, 450, there is alert delay timer information 420. For example, the first entry 430 has a value of zero for alert delay timer information 420. The second entry 440 has first delay timer information and the third entry 450 has second delay timer information. The alert delay timer information 420 and its use in various examples will be discussed in more detail below. Lastly, other status information 422 can also be maintained in the message status repository 242 for each entry 430, 440, 450.

Referring to FIG. 5, a more detailed view of an example of a message alert profile 244 is shown. The message alert profile 244 can be implemented, according to one example, as a table containing one or more message alert profiles. These alert profiles can be associated with particular events that are associated with playing alerts at one or more of the devices 102, 104, 106. For example, a message alert profile 244 can be associated with a message that was received and stored in the message database 240 and thereby can be used to provide message-received-event alerting instructions and configured parameters to the message alert controller 238 to implement particular alerting schemes between one or more devices 102, 104, 106, when may be in proximity with each other. Each entry in the message alert profile table 244 includes a profile ID number 502 which identifies the particular alerting profile to be used in association with a particular message stored in the message database 240. In the example shown in FIG. 5, the first entry 530 is numbered one for the profile ID number 502, the second entry 540 has a profile ID number 502 with a value of two, and the third entry 550 has a profile ID number 502 with a value of three. A device same-message received alerting priority scheme 504 is included with each message alert profile entry 530, 540, 550. In the table shown in FIG. 5, the device priority schemes (DPS) are numbered one, two, and three. The device priority scheme 504 indicates to the message alert controller 238 which of the devices 102, 104, 106, when in proximity with each other, has the highest priority for alerting to the user, and optionally other of the devices can also be ranked in relative priority.

Each entry 530, 540, 550, in the message alert profile table 244 also includes information that is used by the message alert controller 238 to implement a message alerting procedure based on the device priority scheme 504. This additional alerting procedure information is organized in the entries 530, 540, 550, in the current example, with conditional statement information 506 (e.g., C1, C2, and C3), associated action information 508 (e.g., A1, A2, and A3), and an associated set of configuration parameters 510 (e.g., P1, P2, and P3). The conditional statement information 506, the action information 508, and the configuration parameters 510, are used to implement particular alerting procedures for the one or more devices 102, 104, 106, that may be in proximity with each other. Examples using the conditional statement information 506, the action information 508, and the configuration parameters 510, will be illustrated below. It should be noted, however, that alerting procedures may comprise any type of alerts, such as, but not limited to, silent alerts (also referred to as tactile alerts or haptic alerts), audible alerts, visual alerts, and other types of alerts, and any combination thereof. It is understood that the present disclosure anticipates many different types of silent alerts, audible alerts, and visual alerts. For example, and not for limitation, audible alerts may include different types of tone alerts and musical alerts, and visual alerts may include visual indicators, displayed messages on a display, lamps, LEDs, and the like. Lastly, other profile information 512 can also be included with each entry 530, 540, 550. A more detailed discussion of how the information in the message alert profile table 244 is used by the message alert controller 238 will be discussed below.

FIG. 6 illustrates an example of the device proximity status flags 246 that are used by the local (e.g., "primary") device, such as the mobile phone 102, to keep track of the proximity status of the other (e.g., "secondary") devices that are in a smart alerting arrangement with the local device, in this case the mobile phone 102. According to one example, the device proximity status flags 246 are arranged in a table data structure. However, other alternative data structures are anticipated according to various embodiments of the present disclosure.

The secondary device ID number 602 for each entry 630, 640, 650, in the secondary device proximity status table 246 indicates that the entry 630, 640, 650, corresponds to a particular secondary device. As an example, the first entry 630 corresponds to a secondary device number one, the second entry 640 corresponds to a secondary device number two, and the third entry 650 corresponds to a secondary device number three. For example, the first entry 630 can correspond to the desktop personal computer 106, the second entry 640 can correspond to the laptop PC 104, and the third entry 650 can correspond to another secondary device, such as a tablet computer that is not shown in the example of FIG. 1. Proximity status information 604 is included with each entry 630, 640, 650, in the table 246. The proximity status information 604 indicates whether the particular secondary device is in proximity with the local (e.g., "primary") device, which in this example is the mobile phone 102. Lastly, other device information 606 can be included with each entry 630, 640, 650.

Figure 7:
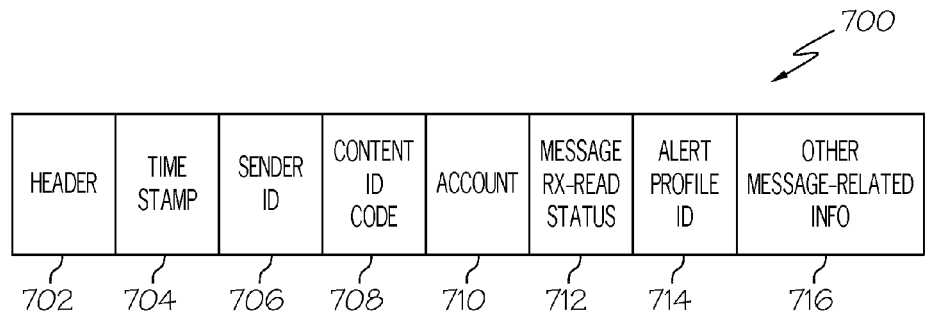
FIG. 7 is a first example of a message packet block diagram for use in communicating messages according to a communication protocol between communication devices in the communication system of FIG. 1.

Referring to FIG. 7, an example of a message signal 700 is illustrated for use in message signal communication between two or more personal electronic devices 102, 104, 106, such as when they may be in proximity with each other. The message signal 700 is typically transmitted between the devices 102, 104, 106, using short range communication to provide information regarding one or more messages stored in the message database 240. However, the message signal 700 according to an alternative embodiment could be transmitted between devices using long range communications. Optionally, if two or more devices 102, 104, 106, are interconnected such as via the auxiliary I/O interface 232 the message signal 700 may be transmitted over a tethered link between the two devices 102, 104, 106. In the latter case above, the communication is over a tethered link, such as a wired link, an optical link, or other similar communication link, and not over a wireless communication link. However, the two or more devices 102, 104, 106, being tethered together does not preclude, in certain embodiments, use of other wireless communication, such as short range wireless communication, between the devices 102, 104, 106, to communicate the message 700.

The message signal 700, according to one example, includes various pieces of information to communicate message status information and other message related information that correspond to one or more messages stored in the message database 240. A header 702 in the transmitted message signal 700 is used to coordinate the communication of the message signal 700 between the two respective devices 102, 104, 106. The header 702 may include, for example, messaging protocol specific information and communication error detection/correction information associated with the transmitted message 700, for effective communication of the message 700 between the two or more respective devices 102, 104, 106.

According to a one example, a transmitted message signal 700 includes message content information from one or more messages stored in the message database 240. The message content information is transmitted from one first device 102, 104, 106, to one or more of the other devices 102, 104, 106. In this way, message content information for one or more messages stored in the message database 240 of the one first device 102, 104, 106, can be synchronized from the one first device to the other devices. When the one first device, for example, receives a message and stores the message in the database 240 of the device, the one first device can intercommunicate with the other devices that are in a synchronization arrangement with the one first device, such as using short range wireless communication or other communication means, to determine if the other devices have also received the same message. If the one first device 102, 104, 106 determines that one or more of the other devices 102, 104, 106 have not received the same message, then optionally the one first device can intercommunicate with the other devices to synchronize the received message from the one first device to the other devices. All devices then would have the same message updated in the respective message database 240 of each device when any one of the devices receives a message such as an email message received in a communication system 100 (see FIG. 1).

According to a second example of a transmitted message signal 700, message status information from the message status repository 242 is transmitted from one device 102, 104, 106 to the other devices 102, 104, 106. In this example, time stamp information 704, sender ID information 706, content ID code information 708, and account information 710, can be included in the message signal 700 to correspond to the time stamp information 404, sender ID information 406, content ID code information 408, and account information 410, that is stored in each entry 430, 440, 450, in the message status repository 242.

Message received, message alerted, and message read, status information 712 is also included in the message signal 700 to indicate such status corresponding to a particular message that is stored in the message database 240 and corresponding to an entry 430, 440, 450, in the message status repository 242. Alert profile ID information 714 corresponds to the alert profile ID information 412 stored in each entry 430, 440, 450, in the message status repository 242. Other message related information 716 may also be included in each message signal 700 transmitted between the devices 102, 104, 106, in proximity with each other.

A message signal 700 can be sent, for example, from the mobile phone 102 to the laptop PC 104, and a second message can be sent from the mobile phone 102 to the desktop personal computer 106, to let the other devices 104, 106, keep track of the status of particular messages that are received and stored in the message database 240 of the mobile phone 102. Optionally, a single group message destined for reception by all of the other devices 104, 106, may be transmitted from the mobile phone 102.

In a similar fashion, a message signal 700 could be transmitted from the personal computer 106 to the laptop PC 104 and a second message can be sent to the mobile phone 102 to inform the other devices 102, 104, of the messages that are stored in the message database 240 of the personal computer 106. Optionally, a single group message destined for reception by all of the other devices 102, 104, may be transmitted from the personal computer 106.

Again in similar fashion to that discussed above, the laptop PC 104 could send one or more messages 700 to the other devices 102, 106, to inform the other devices 102, 106, of messages stored in the message database 240 of the laptop PC 104. In this way, the devices 102, 104, 106, can continuously transmit the messages 700 between each other device to keep all devices informed and updated with the status information associated with particular messages that are stored in the message database 240.

Figure 8:
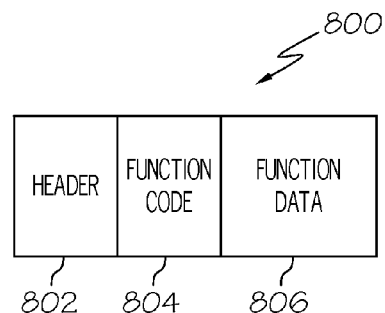
FIG. 8 is a second example of a message packet block diagram for use in communicating messages according to a communication protocol between communication devices in the communication system of FIG. 1.

FIG. 8 illustrates an update message packet 800 that can be transmitted between the devices 102, 104, 106, to update configuration information between the devices 102, 104, 106, whenever any of the devices changes the configuration information stored locally in that device. The message packet 800 includes a header portion 802, a function code portion 804, and a function data portion 806. The header portion 802 normally includes communication overhead information to facilitate the communication of the update message packet 800 between devices. The header portion 802 may include such information as a synchronization bit pattern, destination address information, packet ID information, packet data payload error detection code and/or error correction code, and a delimiter identifying start of the data payload portion of the packet 800. The data payload portion of the packet 800 includes, in this example, the function code portion 804 and the function data portion 806. The function code portion 804 includes code information that identifies the update function for updating configuration information in one or more of the other devices 102, 104, 106. The function data portion 806 includes information that corresponds to the data being updated based on the update function for updating configuration information in one or more of the other devices 102, 104, 106. Examples of the function code portion 804 and the function data portion 806 that can be transmitted in an update message packet 800 will be discussed below.

The update message packet 800 is transmitted between the devices 102, 104, 106, to update configuration information between the devices 102, 104, 106, whenever any of the devices changes the configuration information stored locally in that device. For example, if a user using the user interface 210 of the mobile phone 102 desires to configure a certain alert profile 530, 540, 550, in the message alert profile table 244, the user, via the user interface 210, can change configuration information associated with one or more particular message alert profiles 530, 540, 550. The mobile phone 102 then transmits this change of message alert profile information via the update message packet 800 to the other devices 104, 106, such that the message alert profile information 244 in the other devices 104, 106, is also updated and thereby synchronization is maintained between the devices 102, 104, 106, with respect to the changing message alert profile information 244 in the mobile phone 102. In this way, any change in the message alert profile information 244 in one of the devices 102, 104, 106, will be updated to all the devices 102, 104, 106, that are synchronized with each other.

In another example, proximity status information can be updated across to all the devices 102, 104, 106, to maintain synchronization between the devices 102, 104, 106, when any two or more of the devices are determined at least by one of the devices 102, 104, 106, in proximity with each other. The secondary device proximity status flags 246 would be updated according to the received update message packet 800. For example, if the desktop personal computer 106 detects that the laptop PC 104 is in proximity then the personal computer 106 can transmit an update message packet 800 to the mobile phone 102 to inform the mobile phone 102 that the laptop PC 104 and the desktop personal computer 106 are in proximity with each other. This update of information is independent of whether the mobile phone 102 is in proximity with the laptop PC 104.

Additionally, this update of information sent between any two or more devices 102, 104, 106, regarding their own proximity status is an affirmative confirmation between them that at least one of them has detected proximity status between the two or more devices. That is, for example, when the mobile phone 102 detects that the desktop personal computer 106 is in proximity with the mobile phone 102, the mobile phone 102 transmits the update message packet 800 to the personal computer 106 to inform and update the personal computer 106 that the mobile phone has detected that they are in proximity with each other. A similar exchange of an update message packet 800 between the desktop personal computer 106 and the mobile phone 102 can confirm to the mobile phone 102 that the desktop personal computer 106 has detected that the mobile phone 102 is in proximity with the personal computer 106. Optionally, a single group update message packet 800 can be sent from one of the devices to all of the other devices to inform and update the other devices as to proximity status of two or more of the devices.

The proximity of two devices 102, 104, 106, for example, can be determined by any one of the devices 102, 104, 106, in various ways, and then the proximity status information can be transmitted between the devices 102, 104, 106, to affirmatively confirm that the devices have detected proximity between two or more devices. Additionally, when at least one of two devices 102, 104, 106, detect that they are not in proximity with each other, but they are still in communication range with each other, the at least one of the two devices can exchange one or more of these update packets 800 with the other devices 102, 104, 106, to notify, and confirm with, each device 102, 104, 106, that two or more of the devices have now moved out of proximity from each other.

Figure 9:
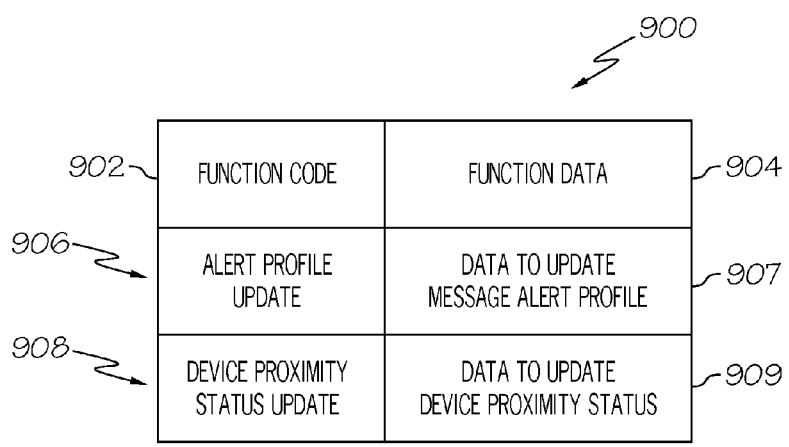
FIG. 9 is a table illustrating examples of function codes and associated function data that may be transmitted with the second message block diagram of FIG. 8.

FIG. 9 illustrates a table 900 with specific examples of function code 902 and function data 904 that may be transmitted in the function code 804 and the function data 806 portions of the update message packet 800 shown in FIG. 8.

For example, if alert profile information of one device has been locally updated, such as by a user of the device, the device can update configuration of the alert profile information to the other devices 102, 104, 106. An update message packet 800 can include a code indicating alert profile update 906 as the function code in the function code 804 portion of an update message packet 800. The update message packet 800 also includes specific data-to-update-message-alert-profile-information 907 in the function data 806 portion of the update message packet 800. This data 907 is then updated to, and configured in, one or more of the other devices 102, 104, 106. For example, if one of the devices locally updates an alert profile to a "silent alert", the device can send an update message packet 800 to the other devices 102, 104, 106 to update each of the other devices' corresponding alert profile to a "silent alert".

Similarly, if device proximity status information has been locally updated in one of the devices 102, 104, 106, the same device proximity information can be updated in the other synchronized devices 102, 104, 106, by transmitting an update message packet 800 from the one device to the other devices. The update message packet 800, in this example, includes a device proximity status update code 908 in the function code 804 portion of the update message packet 800 and includes the specific device proximity status information 909 in the function data 806 portion of the update message packet 800. This specific device proximity status information 909 is then received by the other devices and updated and configured in the other devices. For example, based on the received device proximity status information 909, each of the other devices can update certain device proximity status flags 246 stored in each of the other devices.

Figure 10:
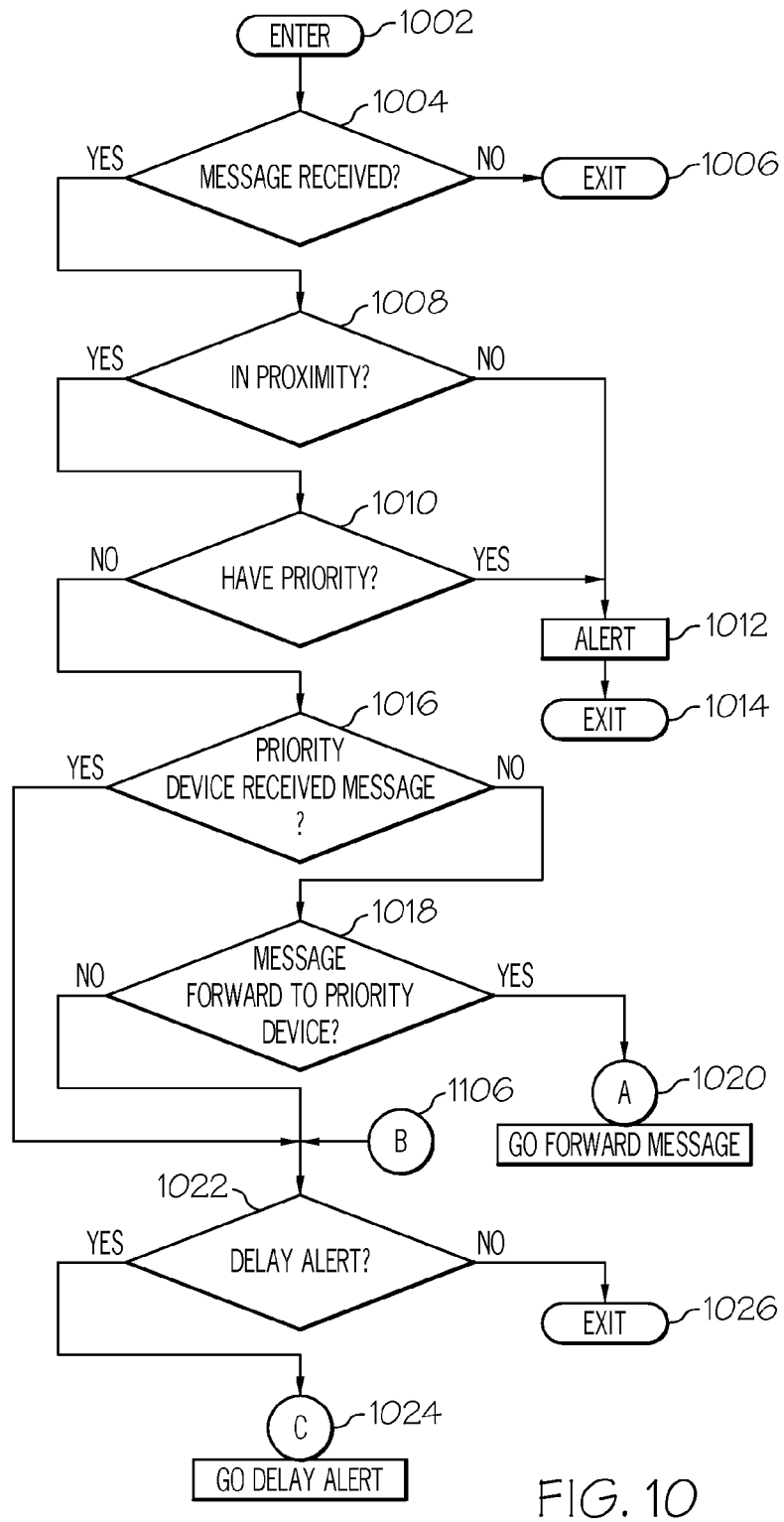
FIGS. 10 to 12 are flow diagrams illustrating various operational flow sequences for a communication device in the communication system of FIG. 1, in accordance with various examples.
Figure 11:
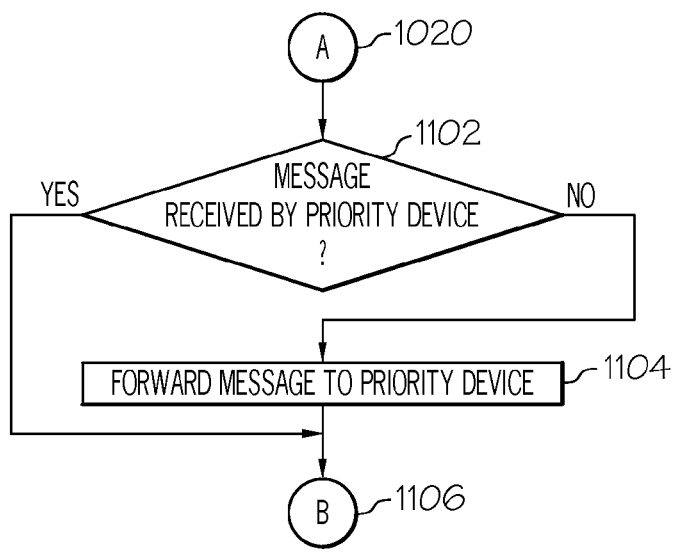
Figure 12:
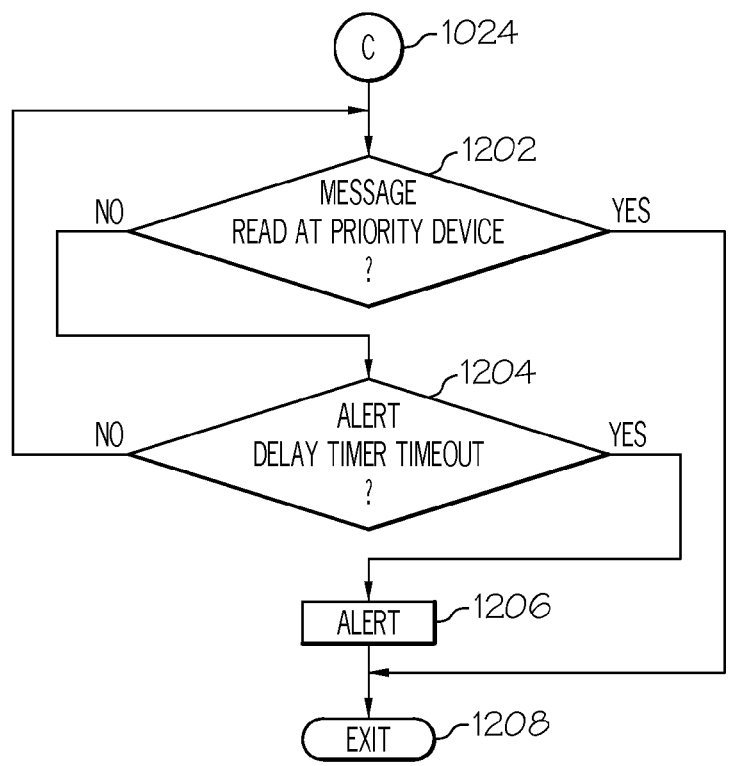

FIGS. 10, 11, and 12, illustrate an example of an operational flow diagram for one of the devices 102, 104, 106, to perform an alerting procedure based at least on configuration information in the one device. The message alert controller 238 for a particular device, such as the mobile phone 102 as shown in FIG. 2, interoperates with the processor/controller 204 to perform an alerting procedure such as indicated by an alert profile 530, 540, 550, in the message alert profile table 244. The message alert controller 238, at steps 1002, 1004, determines whether a message has been received and stored in the message database 240. If no message has been received, at step 1004, then the flow diagram exits, at step 1006.

When a message is received, at step 1004, the message alert controller 238 determines whether the device, such as the mobile phone 102, is in proximity with one or more of the other devices, at step 1008. If the local ("primary") device, in this example the mobile phone 102, is determined not to be in proximity with another one of the other ("secondary") devices, at step 1008, then the mobile phone 102 provides an alert, at step 1012, to alert the user that a message has been received, and then exits the flow diagram, at step 1014.

If the local device, e.g., the mobile phone 102, is determined to be in proximity with another one of the other devices 104, 106, at step 1008, the message alert controller 238 determines, at step 1010, whether the mobile phone 102 has priority over the other devices 104, 106. If the message alert controller 238 determines that the mobile phone 102 has priority, at step 1010, then the message alert controller 238 alerts, at step 1012, to indicate that the message has been received, and then exits, at step 1014.

As has been discussed above, the message alert controller 238, according to one example, can determine priority of the devices by the device priority scheme 504 indicated in the particular message alert profile 530, 540, 550, that is associated with the received message. That is, each received message is associated with a record 430, 440, 450, in the message status repository 242. Each such message status record 430, 440, 450, includes an alert profile ID 412 which associates the record 430, 440, 450, with one of the message alert profiles 530, 540, 550, in the message alert profile table 244.

The association of a received message to one of the message alert profiles 530, 540, 550, for example, can be automatically set by the processor/controller 204 according to a configuration setting in the particular device 102, 104, 106. For example, a transmitted message may be destined for reception by the particular device according to address information included with the transmitted message. According to one example, the transmitted message, when received by the particular device and based on this address information, can also be associated with an account represented as an account entry 410 in the message status record 430, 440, 450, in the message status repository 242.

The processor/controller 204 may be configured, according to one example, to automatically associate for a received message such account 410 in the message status record 430, 440, 450, with a particular alert profile ID 412 which then points to one of the message alert profiles 530, 540, 550, in the message alert profile table 244. Other methods of configuration settings for association of a received message to one of the message alert profiles 530, 540, 550, (and device priority schemes) are also anticipated according to various embodiments of the present disclosure. As another example, a configuration setting in the particular device 102, 104, 106, can cause the processor/controller 204 to automatically associate a received message based on one or a combination of the following: sender ID 406, Time Stamp 404, Content ID Code 408, and user manual configuration, for association of received messages to message alert profiles 530, 540, 550, (and device priority schemes).

Each such message alert profile 530, 540, 550, includes a device priority scheme 504. The device priority scheme 504 indicates to the message alert controller 238 which of the devices 102, 104, 106, when in proximity with each other, has the highest priority for alerting to the user, and optionally other of the devices can also be ranked in relative priority.

Continuing with the discussion of the operational flow diagram of FIG. 10, if the message alert controller 238 of the mobile phone 102 determines that the mobile phone 102 does not have priority, at step 1010, then the message alert controller 238 determines which of the other devices 104, 106, has the priority and whether the priority device has received the same message as the one received by the mobile phone 102, at step 1016. This determination can be done by the message alert controller 238 with reference to the secondary device status information 414, 416, in the particular message status record 430, 440, 450, in the message status repository 242.

Optionally, upon initial receipt of a message by the local device, e.g., the mobile phone 102, upon determining that it does not have priority and that it also does not have secondary device status information 414, 416, to determine whether another priority device has received the same message as the one received by the mobile phone 102, the mobile phone 102 can allow for a short delay time period to synchronize using message intercommunication between the devices 102, 104, 106, and thereby update current information in the secondary device status information 414, 416, in the particular message status record 430, 440, 450, in the message status repository 242. Thereafter, the message alert controller 238 of the mobile phone 102, with reference to the secondary device status information 414, 416, in the particular message status record 430, 440, 450, can determine whether the priority device has received the same message as the one received by the mobile phone 102, at step 1016. According to the present example, the mobile phone 102 ("secondary device") inhibits playing at the mobile phone 102 a message received alert associated with the same message as that which should have been received by the priority device.

If the mobile phone 102 determines, at step 1016, that the priority device has not received the same message then according to one example, at step 1018, the mobile phone 102 optionally determines whether a message forwarding to the priority device is configured for the mobile phone 102. If this feature is configured for the mobile phone 102, at step 1018, then the mobile phone continues the flow diagram at connector A 1020 shown in FIG. 11.

In this case, the mobile phone 102 has received a message and has determined, at step 1016, that another priority device, in this example one of the laptop PC 104 and the personal computer 106, has not received the same message. The mobile phone 102 according to this configuration forwards a copy of the received message, such as via short range wireless communication, to the priority device that has not received the same message.

With reference to FIG. 11, the message alert controller 238 proceeds, at step 1020, to confirm whether the same message was received by the priority device, at step 1102. If the same message was not received, at step 1102, then the message alert controller 238 interoperates with the processor/controller 204 to transmit and forward a copy of the message to the priority device, at step 1104. That is, for example, the message alert controller 238, interoperating with the processor/controller 204, passes the message stored in the message database 240 to the short range communications module 230, in the present example, and the copy of the message is transmitted to the priority device over short range wireless communications. According to one example, the copy of the message can be transmitted to the priority device using message communication as has been discussed above with reference to FIGS. 7, 8, and 9.

As an example, if the priority device is the personal computer 106, the mobile phone 102 can transmit the message to the desktop personal computer 106 over short range wireless communications. Alternatively, if the two devices are tethered together, such as via a USB connection between the two devices, the mobile phone 102 can transmit the message to the desktop personal computer 106 using communication between the two devices over the USB connection.

The desktop personal computer 106, upon receiving the forwarded message from the mobile phone 102, according to one example, stores the received message in its local message database 240 and then proceeds to execute an alerting procedure in accordance with one of the entries 530, 540, 550, in the message alert profile 244 that is associated with the received message. The mobile phone 102, after forwarding the message to the priority device, at step 1104, or if it has determined that the message was received by the priority device, at step 1102, then proceeds, via step 1106 (back to FIG. 10), to determine whether a delayed alert feature is associated with the received message, at step 1022. If there is no delay alert feature associated with the received message, at step 1022, then the message alert controller 238 exits the operational flow diagram, at step 1026.

On the other hand, if there is a delay alert feature configured for the local device, at step 1022, then the message alert controller 238 proceeds, via step 1024 (to FIG. 12), to determine whether there is a delay in the alert by first determining whether the message was read at the priority device, at step 1202. Note that a received message signal 700 from the priority device would cause update of the message read status information in the local device. If the message was read, at step 1202, then the message alert controller 238 exits, at step 1208. No reminder alert is provided by the secondary device (s), since the secondary device(s) determine that the message was read at the priority device.

However, if the message has not been read at the priority device, at step 1202, then the message alert controller 238 in the local device checks the alert delay timer 420 associated with the particular message status record 430, 440, 450, at step 1204. Specifically, this delay timer value 420 is found in the particular entry 430, 440, 450, that is in the message status repository 242 that is associated with the particular message stored in the message database 240. Alert delay timer information 420 is found in each of the entries 430, 440, 450 of the message status repository 242, for messages that are associated with this message delay alert feature. This alert delay timer information, according to various embodiments, is set to a pre-determined amount of delay time to enable starting a timer.

If the alert delay timer has not timed out yet (i.e., the alert delay timer value 420 is not zero in the present example), at step 1204, the message alert controller 238 monitors whether the priority device has read the message, at step 1202. The repeated checking (monitoring) continues until the message alert controller 238 determines, at step 1204, that the alert delay timer 420 has timed out (i.e., until the alert delay timer value 420 is zero in the present example). According to the present example, no reminder alert will be provided by the secondary device(s) if the secondary device(s) determine that the message was read at the primary ("priority") device, such as by having received a message signal 700 from the primary device indicating that the message was read.

When the timer times out, at step 1204, the message alert controller 238 alerts the user of the local device that the message has been received and is waiting to be read, at step 1206, and then exits, at step 1208. This delayed alert by the message alert controller 238 in the mobile phone 102 provides a reminder alert to the user of the mobile phone and of the other device(s), such as the personal computer 106 and the laptop PC 104. The user then has the alert indication that a message has been received and can determine whether to read the message at the mobile phone 102, or at one of the other priority device(s) 104, 106.

Discussion of Various Scenarios

In general, one example of the present disclosure will be able to change the notification (e.g., alert generation) behavior of devices that are known to be in close proximity with each other. Proximity can be determined by wireless means—for example, using short range communications based on any short range wireless technology such as, but not limited to, BLUETOOTH®, ZIGBEE®, and Near Field Communication (NFC) technologies, or using WIFI, communications between devices, or by other means—for example if a smartphone 102 is connected via USB connection with a desktop personal computer 106 the two devices 102, 106 may be considered in close proximity with each other. One of the devices could be configured as the primary device, e.g., for playing an alert, when more than one device is present in proximity with each other, and the other device(s) would either not play the alert, or delay playing the alert by a period of time long enough that a user of the device(s) could respond on one or on any of the devices, thus dismissing the pending alerts on the other devices(s).

This notification strategy could be used even with devices that are located in relatively long range distances between each other. For example, according to one example, when WIFI wireless communication is used between two or more devices, the primary device and one or more secondary devices might be many meters apart from each other so that a user would not be likely in contemporaneous direct manual contact with both devices.

Additionally, according to various embodiments of the present disclosure, the playing of the alert by a secondary device, for example, might be delayed by 15 to 30 seconds from the playing of the alert by the primary device. This delay time period, according to one example, is configurable by the user in any one of the devices. The user by entering this configuration of delay time period in one device, according to one example of the present disclosure, would cause that device to propagate the configuration data from that device to all of the other associated devices such that based on one of the devices being configured by the user then all of the devices would be configured with the same delay time period. The primary device would play the alert first, such as when a message is received by the device. Without detection of interaction with the primary device by the user in relation to this first alert condition (e.g., the receipt of a message), the secondary device would play the alert after the delay time period. This gives the user of the two devices an opportunity to interact with at least one of the devices in relation to the alerted event, e.g., receipt of a message or other occurrence of an event needing attention from a user of the device(s). According to certain embodiments, a second (e.g., "reminder") alert from a secondary device may be played after a brief (but configurable delay) following an alert from a primary device is played for the same event.

Various embodiments of the present disclosure provide a mechanism for the user of more than one device (e.g. a smartphone and a personal computer) with the ability to intelligently manage alert events (e.g. a calendar event alert, a task reminder event alert, or an alert relating to the delivery of content). An alert manager/controller 238 has the ability to establish that, for example, two of a user's devices are in close proximity (e.g. utilizing BLUETOOTH®, ZIGBEE®, or Near Field Communication (NFC) technologies, or using WIFI), and therefore it is possible to send a notify signal to a 'primary device' and to a 'secondary device' for a particular event. Further, if two devices are determined to be within a specific distance (e.g., within 200 meters of each other) a time-delay may occur between playing an alert at the primary device, followed by playing an alert at the secondary device for the same event.

The present subject matter can be realized in hardware, software, or a combination of hardware and software. A computer system can be realized in a centralized fashion in one computer system, or in a distributed fashion where different elements are spread across several interconnected computer systems. Any kind of computer system—or other apparatus adapted for carrying out the methods described herein—is suitable.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include a non-transitory medium such as a computer readable storage medium embodying non-volatile memory, such as read-only memory (ROM), flash memory, disk drive memory, CD-ROM, and other permanent storage. Additionally, a non-transitory medium may include volatile storage such as RAM, buffers, cache memory, and network circuits. Furthermore, according to certain alternative examples, the computer readable medium may comprise computer readable information in a transitory state medium such as a network link and/or a network interface, including a wired network or a wireless network that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. For example, while the discussions above have been mainly directed at message reception alerting at one or more devices, it should be understood that the alerting of a particular event at multiple devices can equally be applicable for other types of events, such as a calendar event alert, a task reminder event alert, or an alert relating to the delivery of content. The scope of the disclosure is not to be restricted, therefore, to the specific embodiments, and it is intended that the appended claims cover any and all such applications, modifications, and embodiments within the scope of the present disclosure.

What is claimed is:

1. A method for controlling notification of arrival of a message, comprising:
   determining, by a communication device, that the communication device and at least one other communication device are in proximity with each other;
   determining that a same message was received by the communication device and the at least one other communication device; and
   determining, by the communication device based at least on the determining that the communication device and the at least one other communication device are in proximity and the determining that the same message was received by the communication device and the at least one other communication device, to inhibit producing a notification that indicates the same message was received by the communication device.

2. The method of claim 1, further comprising, based on the determining to inhibit, inhibiting producing the notification on the communication device.

3. The method of claim 2, further comprising:
for a pre-determined amount of time while inhibiting producing the notification on the communication device, monitoring for reception, by the communication device, of a signal that indicates the message was read;
determining that the pre-determined amount of time has expired and that the signal indicating the message has been read has not been received; and
producing, based on determining that the pre-determined amount of time has expired and that the signal has not been received, the notification on the communication device.

4. The method of claim 3, wherein at least one of a notification type and the pre-determined amount of time is user-configurable.

5. The method of claim 4, further comprising:
configuring at least one of the notification type and the pre-determined amount of time for the communication device;
communicating information between the configured communication device and the at least one other communication device; and
configuring the at least one of the notification type and the pre-determined amount of time in the at least one other communication device based on the communicated information.

6. The method of claim 3, wherein the notification that is produced to indicate the message was received comprises at least one of:
a silent alert,
an audible alert, and
a visual alert.

7. The method of claim 1, wherein the communication device and at least one other communication device comprise a wireless communication device and at least one other communication device, the method further comprising:
storing in memory of the wireless communication device same-message-received alert priority information that identifies an alert priority among the wireless communication device and the at least one other communication device in response to each device receiving the same message.

8. The method of claim 1, wherein the communication device and at least one other communication device comprise a wireless communication device and at least one other communication device, the method further comprising:
wirelessly communicating, via short range wireless communication, between the wireless communication device and the at least one other communication device that a message was received by at least one of the wireless communication device and the at least one other communication device.

9. The method of claim 1, wherein the determining to inhibit producing the notification is based on same-message-received alert priority information associated with the communication device.

10. A method with a plurality of personal electronic devices, comprising:
determining, with a first personal electronic device in a plurality of personal electronic devices, that an alert event associated with each of the plurality of personal electronic devices has occurred;
determining, with the first personal electronic device, whether the first personal electronic device is one of a primary alerting device and a secondary alerting device with respect to the alert event;
detecting, with the first personal electronic device, that it is in proximity with at least a second personal electronic device in the plurality of personal electronic devices; and
inhibiting, by the first personal electronic device, playing an alert associated with the alert event by the first personal electronic device based on the determining that the first personal electronic device is a secondary alerting device and based on the detecting that it is in proximity with the at least a second personal electronic device.

11. The method of claim 10, wherein the alert event comprises reception of a same message by each of the first personal electronic device and the at least a second personal electronic device.

12. The method of claim 11, wherein the message comprises an email message and the alert event comprises reception of a same email message by each of the first personal electronic device and the at least a second personal electronic device.

13. The method of claim 11, further comprising:
for a pre-determined amount of time while inhibiting producing the notification by the first personal electronic device, monitoring for reception, by the first personal electronic device, of a signal that indicates the message was read; and
determining that the pre-determined amount of time has expired and that the signal indicating the message has been read by the user has not been received; and
playing, based on determining that the pre-determined amount of time has expired and that the signal has not been received, an alert by the first personal electronic device that indicates the message was received.

14. The method of claim 13, wherein at least one of
a type of alert that is played to indicate the message was received, and
the pre-determined amount of time delay, is configured by a user in one of the first personal electronic device and the at least a second personal electronic device.

15. The method of claim 14, wherein in response to the at least one of the type of alert that is played and the pre-determined amount of time delay being configured in one of the first personal electronic device and the at least a second personal electronic device,
wirelessly communicating information between the first personal electronic device and the at least a second personal electronic device; and
based on the wirelessly communicated information, configuring the at least one of the type of alert that is played and the pre-determined amount of time delay in the other one of the first personal electronic device and the at least a second personal electronic device.

16. A portable electronic device comprising:
a processor/controller;
a short range communications device;
memory, communicatively coupled with the processor/controller;
an alert controller, communicatively coupled with the processor/controller and the memory, the alert controller being configured to
determine whether the portable electronic device and at least one other personal electronic device are in proximity with each other;
determine that a same message was received by the portable electronic device and the at least one other personal electronic device; and determine, based at least on the determining that the portable electronic device and the at least one other personal electronic device are in proximity and the determining that the same message was received by the portable electronic device and the at least one other personal electronic device, whether to inhibit producing by the portable electronic device a notification that indicates the same message was received by the portable electronic device.

17. The portable electronic device of claim 16, the alert controller being further configured to inhibit producing the notification by the portable electronic device based on same-message-received alert priority information associated with the portable electronic device.

18. The portable electronic device of claim 17, wherein the same-message-received alert priority information is stored in the memory.

19. The portable electronic device of claim 16, the alert controller being further configured to
- for a pre-determined amount of time while inhibiting producing the notification on the portable electronic device, monitoring for reception, by the communication device, of a signal that indicates the message was read; and
- determine that the pre-determined amount of time has expired and that the signal indicating the message has been read has not been received; and
- produce, based on determining that the pre-determined amount of time has expired and that the signal has not been received, the notification that indicates the same message was received by the portable electronic device.

20. A computer program product for controlling notification of arrival of a message, the computer program product comprising:
- a non-transitory computer readable storage medium having computer readable program code embodied therewith, the computer readable program code comprising instructions for performing a method comprising:
  - determining, by a communication device, that the communication device and at least one other communication device are in proximity with each other;
  - determining that a same message was received by the communication device and the at least one other communication device; and
  - determining, by the communication device based at least on the determining that the communication device and the at least one other communication device are in proximity and the determining that the same message was received by the communication device and the at least one other communication device, to inhibit producing a notification that indicates the same message was received by the communication device.

21. The computer program product of claim 20, the method further comprising:
- based on the determining to inhibit, inhibiting producing the notification on the communication device.

22. The computer program product of claim 21, the method further comprising:
- for a pre-determined amount of time while inhibiting producing the notification on the communication device, monitoring for reception, by the communication device, of a signal that indicates the message was read;
- determining that the pre-determined amount of time has expired and that the signal indicating the message has been read has not been received; and
- producing, based on determining that the pre-determined amount of time has expired and that the signal has not been received, the notification on the communication device.

23. The computer program product of claim 20, wherein the determining to inhibit producing the notification is based on same-message-received alert priority information associated with the communication device.

* * * * *